(12) United States Patent
Chang

(10) Patent No.: US 10,904,584 B2
(45) Date of Patent: *Jan. 26, 2021

(54) LIVE VIDEO STREAMING SERVICES USING ONE OR MORE EXTERNAL DEVICES

(71) Applicant: Twitter, Inc., San Francisco, CA (US)

(72) Inventor: Wayne Chang, Boston, MA (US)

(73) Assignee: Twitter, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/216,658

(22) Filed: Dec. 11, 2018

(65) Prior Publication Data

US 2019/0124370 A1 Apr. 25, 2019

Related U.S. Application Data

(63) Continuation of application No. 15/414,357, filed on Jan. 24, 2017, now Pat. No. 10,187,666.

(Continued)

(51) Int. Cl.
*H04N 21/2187* (2011.01)
*H04N 21/218* (2011.01)
(Continued)

(52) U.S. Cl.
CPC ........ *H04N 21/2187* (2013.01); *H04H 20/71* (2013.01); *H04N 21/21805* (2013.01);
(Continued)

(58) Field of Classification Search
CPC ......... H04N 21/2187; H04N 21/21805; H04N 21/41407; H04N 21/4223;
(Continued)

(56) References Cited

U.S. PATENT DOCUMENTS 8,214,862 B1 * 7/2012 Lee ................. H04N 21/21805
370/332
8,817,065 B1 8/2014 Mo
(Continued)

FOREIGN PATENT DOCUMENTS

EP 2490179 A1 8/2012

OTHER PUBLICATIONS

Hines, "Meerkat or Periscope? Howto Broadcast Video Via Mobile", Apr. 15, 2015, 20 pages.*

(Continued)

*Primary Examiner* — Pinkal R Chokshi
(74) *Attorney, Agent, or Firm* — Brake Hughes Bellermann LLP

(57) ABSTRACT

In some implementations, a system may include a video broadcasting service, implemented on a server, configured to enable a mobile computing device to broadcast a live feed media stream of an event, over a network, to a plurality of viewing devices. The video broadcasting service is configured to receive the live feed media stream, over the network, from the mobile computing device, where the live feed media stream originates from an external device having a camera configured as a video source for the live feed media stream. The external device may be communicatively coupled to the mobile computing device. The video broadcasting service is configured to provide the live feed media stream, over the network, to the plurality of viewing devices.

19 Claims, 8 Drawing Sheets

Related U.S. Application Data

(60) Provisional application No. 62/287,404, filed on Jan. 26, 2016.

(51) Int. Cl.

| | | |
|---|---|---|
| *H04N 21/414* | (2011.01) | |
| *H04N 21/4223* | (2011.01) | |
| *H04N 21/4788* | (2011.01) | |
| *H04W 4/80* | (2018.01) | |
| *H04H 20/71* | (2008.01) | |
| *H04N 21/4363* | (2011.01) | |
| *H04N 21/61* | (2011.01) | |

(52) U.S. Cl.
CPC ... *H04N 21/41407* (2013.01); *H04N 21/4223* (2013.01); *H04N 21/43637* (2013.01); *H04N 21/4788* (2013.01); *H04N 21/6125* (2013.01); *H04W 4/80* (2018.02)

(58) Field of Classification Search
CPC ......... H04N 21/43637; H04N 21/4788; H04N 21/6125; H04W 4/80; H04H 20/71
See application file for complete search history.

(56) References Cited

U.S. PATENT DOCUMENTS

| | | | |
|---|---|---|---|
| 8,875,208 B1 * | 10/2014 | Abkairov | H04L 65/60 725/115 |
| 9,620,168 B1 | 4/2017 | Townsend et al. | |
| 10,187,666 B2 * | 1/2019 | Chang | H04H 20/71 |
| 2002/0144273 A1 | 10/2002 | Reto | |
| 2003/0026588 A1 | 2/2003 | Elder et al. | |
| 2012/0236031 A1 | 9/2012 | Haddick et al. | |
| 2013/0282446 A1 | 10/2013 | Dobell | |
| 2013/0347046 A1 * | 12/2013 | Bluvband | G06F 3/005 725/109 |
| 2014/0007147 A1 * | 1/2014 | Anderson | H04H 60/33 725/9 |
| 2014/0137144 A1 * | 5/2014 | Jarvenpaa | H04N 21/6582 725/13 |
| 2014/0186004 A1 * | 7/2014 | Hamer | G11B 27/10 386/223 |
| 2014/0215512 A1 * | 7/2014 | Maruyama | G06K 9/00671 725/34 |
| 2015/0058709 A1 * | 2/2015 | Zaletel | G06F 16/252 715/202 |
| 2016/0057457 A1 * | 2/2016 | Clements | H04N 21/2187 725/109 |
| 2016/0073013 A1 | 3/2016 | King et al. | |
| 2016/0277328 A1 * | 9/2016 | Ishizuka | G06F 13/00 |
| 2016/0381109 A1 * | 12/2016 | Barnett | H04L 65/605 709/231 |
| 2016/0381110 A1 | 12/2016 | Barnett et al. | |
| 2017/0208362 A1 * | 7/2017 | Flores | H04N 21/44218 |
| 2017/0272491 A1 | 9/2017 | Ortiz et al. | |
| 2018/0217589 A1 * | 8/2018 | Kim | H04N 5/232945 |

OTHER PUBLICATIONS

Anonymous, "Why is Periscope Video Fee on Andriod so Low Quality?", Nov. 11, 2015, 2 pages.*

Anonymous, "How to use nanoStream for Live Streaming from Parrot Drones", nanocosmos blog, retrieved on 34/12/2017 from https://www.nanocosmos.de/blog/2015/05/how-to-use-nanostream-for-live-streaming-from-drones, 35/28/2015, 5 pages.*

International Search Report and Written Opinion for International Application No. PCT/US2017/061287, dated Mar. 12, 2018, 18 pages.

Invitation to Pay Additional Fees and Partial International Search for International Application PCT/US2017/061287, dated Jan. 17, 2018, 8 pages.

International Search Report and Written Opinion for PCT Application No. PCT/US2017/014830, dated May 10, 2017, 21 pages.

Aguilar, "You Can Now Livestream from a GoPro Using Your iPhone", retrieved on Apr. 12, 2017 from http://gizmodo.com/you-can-now-livestream-from-a-gopro-1642963184, Oct. 6, 2014, 13 pages.

Anonymous, "Easy Guide to the Periscope Video Streaming App", Oct. 7, 2015, 10 pages.

Anonymous, "How to Broadcast a Live Video Feed From Your Phone or Tablet | PCWorld", retrieved on Apr. 12, 2017 from http://www.pcworld.com/article/242633/how_to_broadcast_a_live_video_feed_from_your_phone_or_tablet.html, Oct. 26, 2011, 6 pages.

Anonymous, "Flow to use nanoStream for Live Streaming from Parrot Drones", nanocosmos blog, retrieved on Apr. 12, 2017 from https://www.nanocosmos.de/blog/2015/05/how-to-use-nanostream-for-live-streaming-from-drones, May 28, 2015, 5 pages.

Anonymous, "nanoStream Live Video Encoder on the App Store", retrieved on Apr. 13, 2017 from https://itunes.apple.com/us/app/nanostream-live-video-encoder/id821832862?mt=8, Jan. 8, 2016, 3 pages.

Anonymous, "nanoStream Live Video Player App and SDK released", nanocosmos blog, retrieved on Apr. 13, 2017 from https://www.nanocosmos.de/blog/2016/01/nanostream-live-video-player-app-and-sdk-released/#more-2153, Jan. 12, 2016, 6 pages.

Anonymous, "Phantom 3—standard—user manual v1.2", retrieved on Apr. 12, 2017 from http://dl.djicdn.com/downloads/phantom_3_standard/en/Phantom_3_Standard_User_Manual_v1.2_en.pdf, Sep. 30, 2015, 55 pages.

Burns, "Stream Live Video From a GoPro With Livestream's Latest iOS App", TechCrunch, retrieved on Apr. 12, 2017 from https://techcrunch.com/2014/10/06/stream-live-video-from-a-gopro-with-livestreams-latest-ios-app/, Oct. 6, 2014, 7 pages.

Cheng, "Advanced: Live Aerial Video Streaming / Aerial Videography Using Drones / Peachpit", retrieved on Apr. 12, 2017 from http://www.peachpit.com/articles/article.aspx?p=24548728,seqNum=6, Nov. 26, 2015, 3 pages.

Recolive, "Recolive MultiCam dans l' App Store", retrieved on Apr. 13, 2017 from https://itunes.apple.com/fr/app/recolive-multicam/id576184759?mt=8&ign-mpt=uo=4, Oct. 13, 2015, 4 pages.

Solsman, "Livestream Livens up Go Pro with broadcasting in real time", retrieved on Apr. 12, 2017 from https://www.cnet.com/news/livestream-livens-up-gopro-with-web-broadcasting-in-real-time/, Oct. 6, 2014, 6 pages.

* cited by examiner

LIVE VIDEO STREAMING SERVICES USING ONE OR MORE EXTERNAL DEVICES

CROSS-REFERENCE TO RELATED APPLICATIONS

This application is a continuation of, and claims priority to, U.S. application Ser. No. 15/414,357, filed on Jan. 24, 2017, entitled "LIVE VIDEO STREAMING SERVICES USING ONE OR MORE EXTERNAL DEVICES", which claims priority to U.S. Provisional Application No. 62/287,404, filed on Jan. 26, 2016, entitled "LIVE VIDEO STREAMING SERVICES USING ONE OR MORE EXTERNAL DEVICES," the disclosures of which are incorporated herein in their entirety.

BACKGROUND

An interactive video broadcasting service may allow a broadcasting device to share a live broadcast with a plurality of viewing devices in a social medial platform, and the viewing devices may view and interactive with the live broadcast stream. Typically, the broadcaster controls how the underlying event is captured by controlling the positioning of the camera on the broadcasting device, and this perspective is shared with the viewing devices that joined the broadcast. In some instances, it may be beneficial to provide a more interactive, multi-perspective experience to the viewing devices, but incorporating additional camera devices with enhanced video/audio source selection and control within an interactive video broadcasting service can be challenging.

SUMMARY

In some implementations, a system may include a video broadcasting service, implemented on a server, configured to enable a mobile computing device to broadcast a live feed media stream of an event, over a network, to a plurality of viewing devices. The video broadcasting service is configured to receive the live feed media stream, over the network, from the mobile computing device, where the live feed media stream originates from an external device having a camera configured as a video source for the live feed media stream. The external device may be communicatively coupled to the mobile computing device. The video broadcasting service is configured to provide the live feed media stream, over the network, to the plurality of viewing devices.

In some implementations, the system may include any of the following limitations (or any combinations thereof). The mobile computing device may include a camera also configured as a video source for capturing the live feed media stream. The video broadcasting service may include a source manager configured to select the camera of the mobile computing device or the camera of the external device as the video source for capturing the live feed media stream. The camera of the mobile computing device may be initially selected for capturing the live feed media stream, and the source manager may be configured to select the camera of the external device at a point later in the broadcasting of the event. The source manager may be configured to select the camera of the mobile computing device or the camera of the external device based on an amount of engagements with the live feed media stream by the plurality of viewing devices.

In some implementations, the video broadcasting service may be configured to enable multiple sources for capturing the live feed media stream while a streaming application is executing on the mobile computing device such that the event can be broadcasted from multiple angles, where the multiple sources includes the mobile computing device and the external device. The video broadcasting service may be configured to provide a multi-perspective display of the live feed media stream, where the multi-perspective display provides a display of a first live feed media stream captured by the external device, and a display of a second live feed media stream captured by the mobile computing device. The video data of the live feed media stream may be captured by the external device, and the audio data associated with the live feed media stream may be captured by another source such as a microphone of another external device or a microphone of the mobile computing device.

In some implementations, the video broadcasting service may be configured to switch the video source of the live feed media stream to a camera of the mobile computing device during the broadcast of the event. The video broadcasting service may be configured to switch the video source of the live feed media stream to a camera of a secondary external device during the broadcast of the event. The video broadcasting service may be configured to switch the video source of the live feed media stream to another video source, but continue to capture audio data associated with the live feed media stream from a microphone of the external device. The video broadcasting service may be configured to enable capture of audio data from a source different than what was used to capture video data of the live feed media stream.

In some implementations, a system includes a mobile computing device configured to execute a streaming application to share a broadcast media stream of an event, over a network, with a plurality of viewing devices associated with a social media platform, where the mobile computing device has a first camera configured as a first video source. The system also includes an external device having a second camera configured as a second video source, where the external device is configured to be communicatively coupled to the mobile computing device via a wireless connection. The streaming application is configured to select the second video source for capturing the broadcast media stream, and receive the broadcast media stream captured by the second video source via the wireless connection. The streaming application is configured to send the broadcast media stream to a server computer executing a video broadcasting service to share the broadcast media stream with the plurality of viewing devices.

In some implementations, the system may include any of the above and/or below features (or any combination thereof). The external device may be communicatively coupled to the mobile computing device via a Bluetooth connection. The external device may be communicatively coupled to the mobile computing device via a network associated with the mobile computing device. The external device may be communicatively coupled to the mobile computing device via a Wi-Fi network connection. The streaming application may be configured automatically select the wireless connection among a plurality of available wireless connections. The streaming application may be configured to switch to the first video source during the broadcast of the event such that the same event can be broadcast from multiple angles. The streaming application may be configured to stream audio data associated with the broadcast media stream from a different source than the second video source, where the different source is a microphone of the mobile computing device or a microphone of another external device. The external device may be a drone equipped with the second camera. The external device may be another mobile computing device.

In some implementations, a computer-implemented method for video streaming within a social network may include executing a streaming application on a mobile computing device to share a broadcast media stream of an event, over a network, with a plurality of viewing devices associated with a social media platform, where the mobile computing device has a first camera configured as a first video source. The method may also include connecting an external device to the streaming application, where the external device has a second camera configured as a second video source, and the external device is communicatively coupled to the mobile computing device via a wireless connection. The method may also include receiving the broadcast media stream at the mobile computing device from the external device, where the broadcast media stream is captured by the second video source and received at the mobile computing device via the wireless connection. The method may also include transmitting the broadcast media stream captured by the second video source to the social media platform to share the broadcast media stream with the plurality of viewing devices. In some examples, the method may further include switching to the first video source during a course of the event such that the broadcast media stream is captured by the first video source. Also, the method may be enhanced with any one or more of the features (or any combination thereof) described with respect to the system.

DETAILED DISCLOSURE

Figure 1:
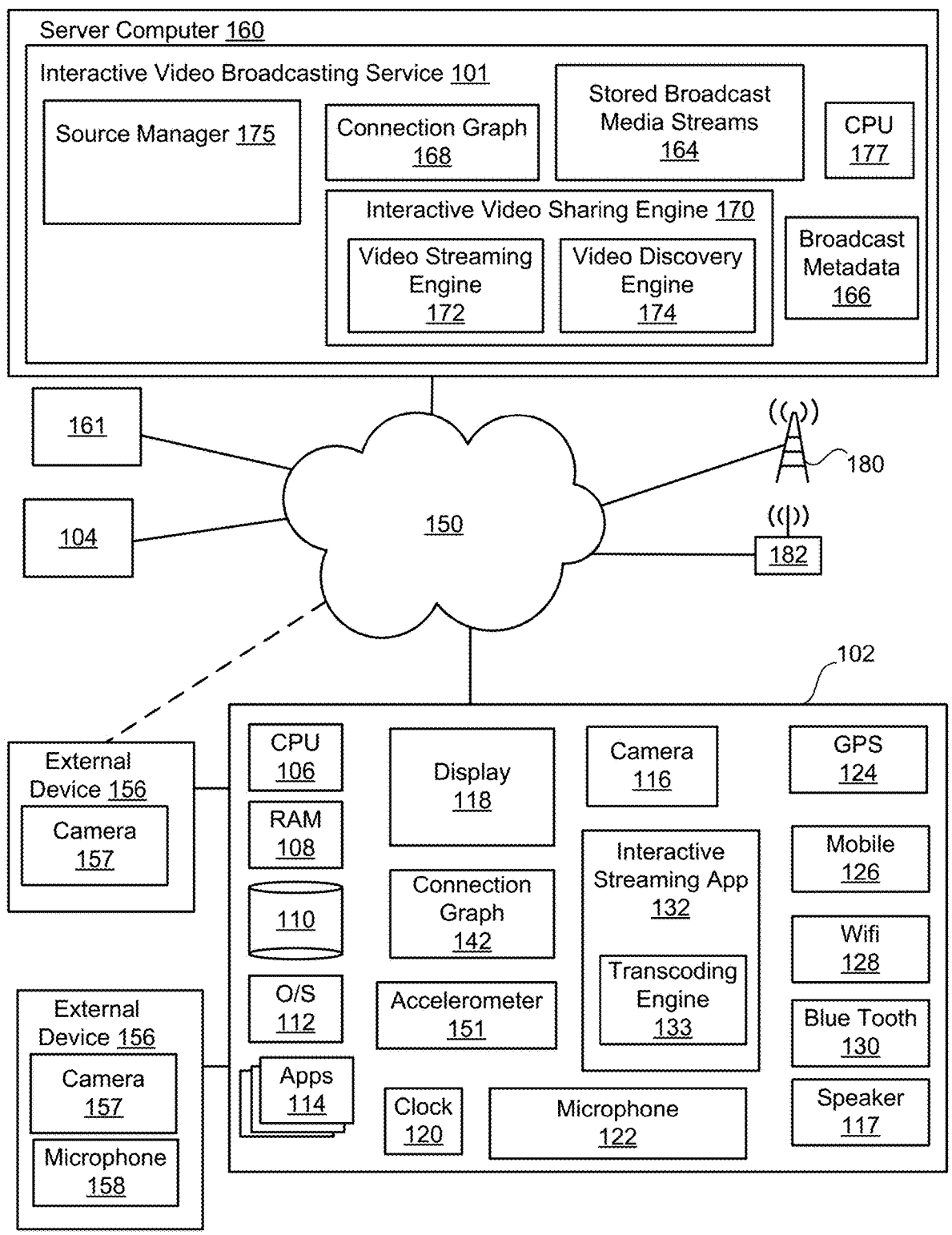
FIG. 1 is a schematic diagram of a system configured to support an interactive video broadcasting service for sharing broadcast streams among users over a network using one or more external devices according to an implementation.

Techniques, methods, and systems are disclosed herein for sharing live-stream video in a social media platform. A broadcaster of a live-stream video can broadcast to many viewers, e.g., all associations, a limited group of associations, including just one association, or other social media users in general. The associations may be followers, circles, friends, connections, or any other form of association. The broadcaster may use a camera on the broadcaster's mobile device and a user interface can allow the broadcaster to stream real-time video to a social media server supporting an interactive video broadcasting service. Also, as further explained below, the broadcaster may use a camera on an external device (e.g., wearable object, drone, another smartphone, camera-equipped vehicle, etc.) such that the broadcaster can stream real-time video captured by the camera on the external device to the interactive video broadcasting service.

The social media server may make the real-time video stream available to other social media users. Thus, the social media server provides a shared broadcast generated by a user without specialized equipment or networks. The social media server may facilitate interactions between the viewers of the real-time video stream that can also be seen by the broadcaster. For example, a viewer may comment on the broadcast, may signal approval for specific moments in the broadcast, and may invite other social media users to join the broadcast. Implementations enable a viewer to signal approval many times throughout the broadcast, rather than just one time. The social media server may provide representations of these activities to all participants in the broadcast. Thus, the broadcaster and anyone viewing the broadcast may see the comments posted and indications of approval from any viewer. In other words, during the broadcast, the viewers and the broadcaster may see comments, approval icons, joining viewers, and rebroadcast messages.

In one implementation, the service described herein provides, in real time or near real time, a crowd-sourced popularity rating for content being broadcasted. Viewers provide approval feedback by, for example, tapping on the screen to indicate they like the content, where the frequency of the tapping provides a general measure of approval for the broadcast, which can be calculated for a single viewer, and/or for the aggregate of all viewers, and/or some subset of all viewers. Moreover, the point in time when the tap occurs also indicates interest in some corresponding event being broadcasted, such that a threshold number of aggregated taps during a broadcast indicates a high probability of the occurrence of an event of high interest. A broadcaster hence has dynamic and real time feedback and can use that information to decide whether to continue broadcasting.

When a broadcast ends, the social media server may store the broadcast for a period of time, for example 12 or 24 hours. Viewers may replay the saved broadcast and may see the comments, approvals, and notification messages at the same time in the broadcast that live viewers also saw these elements. In some implementations, the stored broadcasts may be indexed for later retrieval and replay, which can drive further engagements with the broadcasts. In some implementations, during replay, the replay viewer may add additional signals of approval and/or comments. The system may keep metadata for a broadcast and/or broadcaster, so that popular broadcasts and popular broadcasters can be identified. For example, the system may aggregate signals of approval (also referred to as approval signals) (received during the live broadcast and the replay), number of viewers, as approvals-per-minute, average approval per broadcast for a broadcaster, etc. In some implementations, live broadcasts may also be posted via other social media messages without the interactive capabilities. In some implementations, post-live comments about the message in the other social media platform may be associated with the stored version of the broadcast, e.g. as post-broadcast chat.

In addition, techniques, methods, and systems are disclosed herein for supporting one or more enhanced features and functions of an interactive video broadcasting service. For example, the interactive video broadcasting service may be used with one or more external cameras (e.g., external to the mobile device's camera) instead of (or addition to) to the mobile device's camera.

For example, in some examples, the mobile device's camera may be relatively difficult to use to capture the broadcaster's event. For example, a downhill skier may wish to share a live broadcast of his/her descent down a hill, but operating the mobile device's camera may be relatively difficult to capture this event, since the skier would have to hold the mobile device in a particular manner while skiing down the hill. As such, in some examples, the interactive video broadcasting service may operate in conjunction with one or more external cameras in order to capture the events of the live broadcast stream. For example, while the interactive streaming application is executing on the broadcaster's mobile device, one or more other video sources may be used to capture the event. In the example of the downhill skier, an action camera may be coupled to the skier's helmet, and the action camera may capture the skier's descent instead of using the camera on his/her mobile device. However, the interactive video broadcasting service may operate in conjunction with any type of camera-equipped device such as drones, other smartphones (e.g., the broadcaster's friends or colleagues), car cameras, home cameras, etc.

The video stream captured by the one or more external cameras may be communicated to the interactive streaming application executing on the mobile device via a wired or wireless connection or through a server. In some implementations, the wireless network connection is a short-range network connection (e.g., Bluetooth connection or near-field communication (NFC) network connection) or a mobile network connection (e.g., Wi-Fi, 4G, or satellite). In some implementations, the interactive streaming application may select the appropriate network connection for the range and/or video quality of the broadcast. Also, in some implementations, audio data associated with the live stream broadcast may be switched to whichever device is currently broadcasting or can remain with the device having the best audio, which may be different from the device with the best video. In one specific example, the skier may be using a helmet-mounted camera and a drone that follows him/her down the slope, and the interactive video broadcasting service may have audio captured from the helmet-mounted camera (i.e., the helmet-mounted camera also has a microphone) because it can capture his/her narration (and the swoosh of the skis against the snow) while the video can be captured from the done since the drone may provide better panoramic images.

Therefore, the interactive video broadcasting service may enable multiple sources for capturing audio and/or video data of a broadcast of an event, where one or more of the multiple video sources is remote from the interactive streaming application executing on the mobile device such that the same event can be broadcasted from difficult view points or angles. For instance, while the broadcaster is broadcasting a certain event, the source of the video and/or audio of the broadcast stream can be switched to a different source (e.g., switching from the mobile device to the external device, switching from the external device to the mobile device, or switching from the external device to another external device). In some implementations, the user may operate the interactive streaming application to select between the multiple sources while the event is occurring—which can provide multiple view points or angles to the captured event. In some implementations, the switching may be based on the numbers of approval signals (e.g., number of "hearts", "likes", etc.) received from other viewers. These and other features are further explained with reference to the figures.

FIG. 1 is a schematic diagram of a system 100 configured to support an interactive video broadcasting service 101 executing on a server computer 160 and an interactive streaming application 132 executing on a computing device 102 such that the interactive video broadcasting service 101 can broadcast a live media stream to a plurality of viewers over a network 150 according to an implementation. The system 100 may include one or more computing device(s) 102, 104 connected to one or more server computers 160, 161 through one or more networks 150. Generally, the computing devices 102, 104 may be any type of network-enabled device having a camera 116 with video capturing capabilities. The computing devices 102, 104 may be consumer computing devices and can be a mobile computing device (e.g., a smart phone, a PDA, a tablet, a wearable device, such as a wrist mounted device, or a laptop computer), a robotic computing device (e.g., a drone), and/or a non-mobile personal computing device (e.g., a desktop computing device, internet-enabled television or entertainment system).

As shown in FIG. 1, the computing device 102 may include one or more processors 106 (e.g., a processor formed in a substrate, such as a central processing unit, a graphics processor, etc.), a volatile memory 108, and nonvolatile memory 110. The volatile memory 108 may store, for example, instructions that are executed by the processor(s) 106, and the nonvolatile memory 110 may store, for example, various user data, instructions for executing an operating system, applications, etc. While FIG. 1 illustrates the computing device 102 in more detail than the computing device(s) 104, it is understood that the computing device(s) 104 may include similar components.

The computing device 102 may include a plurality of applications 114, which can be executed by the computing device 102 (e.g., by the processor 106 executing one or more instructions stored in memory 108 or 110 that correspond to the application 114) and which may communicate with an operating system 112 (e.g., through one or more application programming interfaces (APIs)). Execution of the applications 114 can provide various functionalities to a user of the computing device 102. In a few examples, an email application may provide access to the user's email account and email messages associated with the account. A browser application may provide a web browser to a user, so that the user may access content that can be loaded into, and displayed by, the browser application. A social network application can provide content to the user from contacts and sources that the user has chosen to be associated with within the social media platform associated with the social network application. A camera application can provide access to use of the camera 116 within the computing device 102 for capturing still pictures or video. Applications that provide a rich variety of other functionalities and information to the user also can be provided. In some implementations, the interactive streaming application 132 may be considered one of the applications 114.

The computing device 102 includes a display 118 (e.g., a touchscreen display, an LED display, etc.) that can display a user interface for an application 114 that is being executed by the computing device 102. More than one application can be executed at a time. However, in some implementations (e.g., in the case of a smart phone), the size of the display is better suited for a single executing application to be displayed at a time. The executing application that is displayed on the display 118 can be referred to as a "front-facing" application. In some implementations, the display 118 may be housed in a structure separate from a structure housing one or more of the other components of the computing device 102 (e.g., the display 118 is a stand-alone display).

The computing device 102 may include internal speakers 117 that can provide an audio output from the computing device 102. The computing device 102 may also include a port or interface (e.g., USB, micro-USB, cable interfaces, HDMI, wireless interface, etc.) that can be used to connect the computing device 102 to external devices, e.g., speakers that may provide an audio output when connected to the computing device 102 or other types of sensors, cameras, or computing devices. The computing device 102 may also include a microphone 122 that detects sound in the environment of the computing device 102.

The computing device 102 may also include a clock 120 that determines a time and date and may include a GPS transceiver 124 that communicates with a global positioning system to determine a location of the computing device 102. The computing device 102 also includes various network interface circuitry, such as for example, a mobile network interface 126 through which the computing device 102 can communicate with a cellular network, a Wi-Fi network interface 128 with which the computing device 102 can communicate with a Wi-Fi base station 182, a Bluetooth network interface 130 with which the computing device 102 can communicate with other Bluetooth devices, and/or an Ethernet connection or other wired connection that enables the computing device 102 to access network 150. Also, the computing device 102 may include an accelerometer 151 for measuring acceleration of the computing device 102. The computing device 102 may include other sensors (not shown), such as, for example, an ambient light sensor, a temperature sensor, etc.

The interactive streaming application 132 may be configured to enable the computing device 102 to communicate with the interactive video broadcasting service 101 over the network 150. The interactive streaming application 132 may be configured to enable the computing device 102 to start a real-time video stream and share the real-time video stream via a social media platform. The interactive streaming application 132 may be a mobile application, or may be a web-based application. In some implementations, the interactive streaming application 132 may be configured to enable the user to select a privacy setting for the real-time video stream. The privacy setting controls the potential audience for the broadcast stream. A public broadcast is viewable by anyone using the social media platform. The social media platform may provide a message (e.g., push notification) to those directly connected to the broadcaster (e.g. following the broadcaster) in a connection graph, but anyone may join the broadcast. A private broadcast may be viewable only by those directly connected to the broadcaster in a connection graph (e.g., connection graph 168) for the social media platform, who receive a message (e.g., push notification) about the live broadcast. Others social media users not directly connected to the broadcaster may not be able to view the broadcast unless one of the directly connected users sends an invitation to the broadcast, but the broadcaster may disable such sharing by viewers. In some implementations, the interactive streaming application 132 may enable the broadcaster to select specific individuals (e.g., via a username, phone number, or other identifier) who are target viewers for a private broadcast. In some implementations, the individual users may be connected to the user in a connection graph, such as connection graph 142 or connection graph 168.

The connection graph 142 may be a subset of the connection graph 168 that resides on the server 160. A connection graph is a data structure representing relationships (i.e., connections) between one or more entities. For example, the connection graph 168 may be a data set that stores relationships between social media accounts. Relationships may include friending, following, linking, or some other relationship. An entity is directly connected to another entity in the connection graph when the two entities are connected by a path length of one.

After receiving a request from the user who wants to begin a broadcast, the interactive streaming application 132 may be configured to use various components of the computing device 102 to capture and send a real-time video stream and to display interactions (e.g., engagement representations) from viewers of the real-time video stream. For example, the interactive streaming application 132 may use the camera 116, the GPS 124 (or other location-obtaining sensors), and the microphone 122 of the computing device 102 to capture a real-time video stream with audio. Also, as further explained later in the disclosure, the interactive streaming application 132 may use a different video and/or audio source (e.g., one or more external devices 156 communicatively coupled to the computing device 102 or communicatively coupled to the interactive video broadcasting service 101) to capture the real-time video stream with audio. The interactive streaming application 132 may also be configured to use one of the computing components (e.g., network interface 128, mobile network interface 126, etc.) to provide the real-time video stream, over the network 150, to a server, such as servers 160, 161. The interactive streaming application 132 may also be configured to receive engagement indications as well as metadata about the real-time video stream from the servers 160, 161. The metadata may include information such as how many viewers have joined the real-time video stream and are currently viewing the video stream. The engagement indications may represent feedback and information from the viewers of the video stream. For example, the engagements may include comments, signals of approval, share notifications, viewer join notifications, etc. The interactive streaming application 132 may be configured to generate representations of the engagement indications and provide the representations to the display 118.

For example, a signal of approval may be represented by an icon. The icon may be a heart shape, a star shape, a smiley face shape, or some other shape. The interactive streaming application 132 may be configured to add an icon to the display 118 during the real-time video stream for each signal of approval. Each signal of approval may be received from one of the viewers of the real-time video stream. A viewer may send a plurality of signals of approval during the real-time video stream, so that a viewer is not limited to signaling approval for the video stream only once. Instead, the signals of approval may be associated with a particular moment of time in the real-time video stream and a viewer can send as many signals as desired. In some implementations, the icon representing a signal of approval may have a different appearance for each viewer. In other words, other viewers and the broadcaster may be able to determine how many different viewers are sending signals of approval based on the appearance of the icon. For example, signals of approval for a first viewer may be blue hearts, signals of approval for a second viewer may be orange hearts, signals of approval for a third viewer may be purple hearts, etc. Thus, each of the engagement indications may be associated with a particular viewer and the engagement representation generated by the interactive streaming application 132 for the indication may reflect a different user.

The interactive streaming application 132 may be configured to trigger the display of the icons (e.g., representations of signals of approval) for a predetermined period of time. For example, each icon may appear on the display 118 of the computing device 102 for 3 seconds and then disappear or fade out. In some implementations, the interactive streaming application 132 may be configured to animate the icons on the display 118 while displayed. For example, the interactive streaming application 132 may cause the icons to move from a first location to a second location during the predetermined period of time. The movement need not be linear, but may be in a general direction. For instance, the icon may float up or sink down a side edge of the display 118 or move generally across a top or bottom edge of the display 118 during the predetermined time. The interactive streaming application 132 may be configured to display and animate a plurality of the icons, each icon representing a single signal of approval. The icons may overlap with each other in the display.

The interactive streaming application 132 may also be configured to trigger the display of engagement notifications, such as comments from viewers, viewer join notices, and viewer share notifications. The engagement notifications may be displayed with the real-time video stream (and the icons representing signals of approval). Like the icons, the engagement notifications may be configured for display for a predetermined period of time, so that after the predetermined time the notification fades out, for example. The interactive streaming application 132 may scroll comments, so that older comments are moved up (or down or sideways) to make room for new engagement notifications. Thus, while a user of the computing device 102 is providing a real-time video stream, the user of the computing device 102 may also receive real-time feedback from the viewers of the real-time video stream. In some implementations, the interactive streaming application 132 may also be configured to allow the user to share the real-time video stream via the social media platform. When the user shares the video stream, the interactive video sharing engine 170 may be configured to send a message to user accounts directly connected to the user in a connection graph for the social media platform. In some implementations, the message may be a push notification or an email with a control (e.g., link) that allows the invited user to join the video stream. In some implementations, the targeted viewer (e.g., the viewer receiving the notification) may join via a computing device with the interactive streaming application 132 installed. In some implementations, the targeted viewer may join via a browser application or another mobile application without using the interactive streaming application 132, which may include viewing the real-time video without engagements.

In some implementations, when there are more than a threshold number of viewers on a particular broadcast video stream, the interactive video broadcasting service 101 may limit the chat functionality to a predefined number such as the first N viewers of the broadcast. The other viewers may be placed on a waiting list. When an early viewer leaves the broadcast, the next-in-line viewer may participate in chat. In other words, the interactive video broadcasting service 101 may queue the viewers of a particular broadcast video stream in the order of arrival time, and permit the first N viewers from the top of the queue participate in chat. The viewers allowed to participate in chat may be able to provide the full range of engagements such as comments, messages, and indications of approval. However, the other viewers may not be able to provide messages or comments back to the broadcaster. In other examples, the interactive video broadcasting service 101 may arrange the viewers in the queue according to a ranking scheme. For example, high credibility users and/or associations (e.g., friends, followers, etc.) of the broadcaster may have a priority in the queue. For instance, the interactive video broadcasting service 101 may bump these types of viewers to locations that are higher in the queue. Also, the interactive video broadcasting service 101 may remove certain messages that have a relatively low engagement level (e.g., not many indications of approvals or likes) or messages that have been flagged for various reasons. Also, the interactive video broadcasting service 101 may use a queue that is more user or context specific. In other words, the queue (or the chat-enabled list) can be user-specific (context specific). For example, all users can be enabled (to enter the queue) but only certain chats may be surfaced to each viewing user. Comments from associations of the viewing user (context user) can be surface from that user, comments from viewers having relevance or interest to the viewing user can be surfaced to that user, blocked users can be ignored that user, etc.

In some implementations, the interactive video broadcasting service 101 may enable the live broadcast to be posted via other social media platform messages. Such posts may include the video stream but may lack the interactive capabilities. Thus, for example, a social media user in a different platform can receive a message formatted for the different platform that includes the video stream that the social media user can watch. Such a message can include a suggestion that the social media user download and install a version of the interactive streaming application 132, or include a link or other control that opens the interactive streaming application 132 or initiates the install. In some implementations, the server 160 may associate comments about the message from the other social media platform with a stored version of the broadcast, e.g. as post-broadcast chat engagements.

The interactive streaming application 132 may be configured to provide the real-time video stream from a broadcasting computing device 102 to a server, such as the servers 160, 161. The server 160 may be a single computing device, or may be a representation of two or more distributed computing communicatively connected to share workload and resources. In some implementations, the server 160 is a social media platform server. The server 160 may also include one or more processors 177 formed in a substrate configured to execute instructions. The instructions may be stored in memory, such as RAM, flash, cache, disk, tape, etc. In addition, the server 160 may include one or more data stores configured to store data in a persisting manner. For example, the server 160 may store the connection graph 168. The connection graph 168 may be a data structure representing relationships (i.e., connections) between one or more entities. For example, the connection graph 168 may be a data set that tracks relationships between social media accounts. Relationships can include friending, following, liking, linking, or some other relationship. In some implementations the connection graph 168 may represent entities that have installed an interactive streaming application 132 and set up a user account through the interactive streaming application 132.

In some implementations, the connection graph 168 may represent entities from more than one social media platform or entities that have installed various social media applications. Thus, the connection graph 168 may be understood to represent multiple distinct data sources, each representing a separate set of entities and relationships for separate social media platforms. In some implementations, a first user account in one data store may include an identifier for a second user account in a second data store, where the first user account and the second user account correspond to a single human user. Thus, the interactive video sharing engine 170 may be able to access the second data store via the link between the first user account and the second user account. The system may thus access a second social media platform via such connected accounts. The human user may have control over such connections.

The server 160 may also store broadcast metadata 166. Broadcast metadata 166 may store data, e.g., information and statistics, for real-time broadcasts and/or broadcasters. The data may include the engagements received during the live broadcast (and in some implementations, from replays of the stored broadcast), time stamps, duration, the total quantity of viewers, how long each viewer watched the real-time broadcast, etc. The server 160 may also store stored video streams 164 for a limited time. For example, when a broadcaster completes a real-time broadcast, the broadcaster may choose to make the video stream available for replay. Accordingly, the server 160 may store the broadcast video stream in stored video streams 164. The stored video stream may include the engagement indications associated with the video stream. In other words, when the stored video stream is replayed, the viewer watching the replay may also see any engagements received during the real-time video stream.

In some implementations, the interactive video broadcasting service 101 may index the stored broadcast streams for later retrieval and replay. In some cases, the replays can drive further engagements with the broadcast streams. In some implementations, the indexing can be an inverted index keyed by terms associated with the broadcast streams. In some examples, the terms may include terms the broadcaster used in a caption stored with the broadcast stream, terms used by viewers to comment (during the broadcast and/or after during a replay period when the broadcast stream is stored for replay), and/or terms from the recorded audio from the live broadcast. Also, the terms associated with a particular broadcast stream can be obtained from other broadcast streams that have been determined programmatically or by human operators to have captured the same event. For example, programmatic determination can be based on co-occurrence of terms, hashtags, position on a velocity graph of social media messages over time (e.g., a spike in the number of Tweets that coincide with an event), and geolocation.

In some implementations, retrieval responsive to search queries seeking stored broadcast streams for replay can be based on any combination of topicality and qualify signals. Examples of topicality signals may be query terms, terms associated with the stored broadcast streams, authorship, user preferences, time, geolocation, and popularity (based on signals of approval during the live broadcast and/or engagement during the replay period). Examples of quality signals may be video and audio quality, engagement (during the live broadcast and also during the replay period), references to the video (e.g., many references to a video from reliable sources may suggest that the video is not span or otherwise illegitimate).

In some implementations, in addition to being stored on the server 160, the computing device 102 may also store the broadcast stream locally. For example, the interactive streaming application 132 may provide an option to store the broadcast stream locally, e.g., in memory on the computing device 102. In some implementations, the interactive streaming application 132 may store the broadcast stream in the volatile memory 108 and/or the non-volatile memory 110, which can be a Secure Digital (SD) card.

The server 160 may also include an interactive video sharing engine 170. The interactive video sharing engine 170 may service a social media platform, and thus, have access to the connection graph 168 for the social media platform. The interactive video sharing engine 170 may include a video streaming engine 172 and a video discovery engine 174.

The video streaming engine 172 may use the connection graph 168 to determine user accounts directly related to the user account for the broadcaster of the computing device 102. These directly related user accounts may receive a message, for example a push notification, regarding the video broadcast stream. In some implementations, only user accounts that have a "following" relationship with the account corresponding to the broadcaster may receive the message. When the broadcast information indicates the broadcast is private, the information may include identifiers (e.g. user account identifiers) for user accounts that can receive the message (e.g., push notification) about the live video broadcast stream. Thus, in some implementations, a private broadcast may be for a subset of the user accounts directly related to the broadcaster account in the connection graph 168 (e.g., followers, friends, circles, or other forms of associations), whereas a public broadcast can be joined by anyone, but only accounts directly related to the broadcaster are notified of the live video broadcast stream.

The video discovery engine 174 may enable the interactive video sharing engine 170 to suggest real-time video broadcast streams and/or stored video broadcast streams, e.g., in stored video broadcast streams 164, to the viewing devices. In some implementations, the video discovery engine 174 may use the broadcast metadata 166 to provide or suggest real-time video broadcast streams to a user. For example, the video discovery engine 174 may suggest a real-time video broadcast stream that has received many signals of appreciation in a short duration, a real-time video broadcast stream that has a quantity of viewers that exceeds a threshold, a real-time video broadcast stream that has an average number of engagements per second that exceeds a threshold, etc. The video discovery engine 174 may boost the position of a real-time video broadcast stream in the search result based on attributes of the user.

The video discovery engine 174 may also use location data to suggest real-time video broadcast streams for viewing. For example, the video discovery engine 174 may identify several real-time video broadcast streams that are in close proximity to each other. Such real-time video broadcast streams may be an indication of an important event occurring at the location. The video discovery engine 174 may suggest one or more of these real-time video broadcast streams (e.g., selected at random, based on past popularity of the broadcaster, based on number of viewers of the stream, etc.) as a suggested real-time video broadcast stream.

In some examples, the video discovery engine 174 may initiate a user interface that shows the location of the real-time video broadcast streams and may enable a user to select one of the real-time video broadcast streams for preview of viewing. For example, the user may navigate in a map that includes an icon representing the location of live video broadcast streams and the user may select an icon to join or preview the live video broadcast stream associated with the location. In some examples, the video discovery engine 174 may receive a query from a user and search titles of live video broadcast streams and/or comments provided in live video broadcast streams and provide video broadcast streams with responsive titles or comments in a search result to the viewer. The video discovery engine 174 may also search titles and comments for stored video broadcast streams and may provide one or more stored video broadcast streams in the search result.

The interactive video sharing engine 170 may be configured to receive a request to start a real-time video stream from a broadcasting computing device 102. The request may include information from which the interactive video sharing engine 170 can determine target viewers. For example, the interactive video sharing engine 170 may use the connection graph 168 to determine user accounts directly related to the account for the broadcaster. These directly related user accounts may receive a message, for example a push notification, regarding the broadcast. In some implementations, only user accounts that have a "following" relationship with the account corresponding to the broadcaster may receive the message. When the broadcast information indicates the broadcast is private, the information may include identifiers (e.g. user account identifiers) for user accounts that can receive the message (e.g., push notification) about the live video stream. Thus, in some implementations, a private broadcast may be for a subset of the user accounts directly related to the broadcaster account in the connection graph 168 (e.g., followers, friends, circles, or other forms of associations), whereas a public broadcast can be joined by anyone, but only accounts directly related to the broadcaster are notified of the live video stream.

Based on the information received with the real-time video stream and the connection graph 168, the interactive video sharing engine 170 may send messages to the targeted viewers. The message may be in the form of a push notification, but can be an email, or a text that includes a link or activation that connects the target viewer to the real-time video stream. In some implementations, the targeted viewer may only view the real-time video stream if the computing device 102 used by the targeted viewer has an interactive streaming application 132 installed. The interactive streaming application 132 may be a mobile application or a browser-based application. Once a targeted viewer chooses to join the real-time video stream, the video streaming engine 172 may provide the encoded real-time video stream to the viewer, e.g., via computing device 102 or 104.

The interactive video sharing engine 170 may be configured to receive engagements from viewers, associate an engagement with a moment of time, and provide engagement indications with the broadcast video stream to viewing computing devices and the broadcasting device. An engagement is some type of interaction from one of the viewers. For example, a signal of approval is a type of engagement where a viewer expresses approval at a particular moment during the real-time video stream. Another example of an engagement is a comment provided by a viewer. Another example is a share, which may have a corresponding share notification telling other viewers and the broadcaster that a viewer has invited other viewers. In some implementations, only a public broadcast may allow sharing. In some implementations, the broadcaster can control whether viewers can invite other viewers to a private broadcast. Another example of an engagement is a new viewer joining the broadcast, which may be associated with a new viewer notification alerting the broadcaster and other viewers of the new viewer.

The video streaming engine 172 may provide indications of the engagements with the video stream to encourage interaction among the viewers and broadcaster. In some implementations, the interactive video sharing engine 170 may aggregate the different types of engagements, generating statistics for the broadcast. For example, the interactive video sharing engine 170 may track the number of signals of approval received from all viewers per minute, track the total number of signals of approval, track the comments per minute, track the total number of comments, track the total number of viewers, track the average viewing time of the viewers, track the number of shares, etc. The statistics may be stored in the broadcast metadata 166. The broadcast metadata 166 may be used to feature popular broadcasts (e.g., measured by number of viewers, average of signals of approvals per second, etc.) for replay, to suggest popular broadcasters (e.g., based on total number of signals of approvals received over all broadcasts or based on a high average number of signals of approval per second across all the broadcasts for the broadcaster, etc.), to notify potential audience members about a popular live broadcast.

The interactive streaming application 132 executing on the computing device 102 may also be configured with a viewing user interface that enables a potential viewer to receive a notification about a live video stream, join the stream, and provide feedback in the form of comments or signals of approval, to invite others (when approved by the broadcaster), and to share via a social media platform. The interactive streaming application 132 may also be configured to enable a user of the computing device 102 to update the connection graph (e.g., connection graph 168 and/or 142) to enable the user to receive notifications to join real-time broadcasts from a particular account (e.g., an account of the social media platform). In other words, the interactive streaming application 132 may help a first user follow a second user, so that broadcast notifications for the second user are presented to the first user.

The interactive streaming application 132 may be configured to display messages regarding live video streams. A live video stream is one that occurs in real-time, as the broadcaster captures the image. In other words, in a live or real-time video stream the broadcaster is still generating the video stream. If a user chooses to view the live video stream, the interactive streaming application 132 may display the real-time video stream on the display 118 of the viewer's computing device 102. The interactive streaming application 132 may also be configured to enable the user to provide engagements during the live video stream. For example, when a user provides an approval gesture, such as a tap on a touch screen display 118 or use of an input device, such as a mouse, to click in the display 118, while watching the live video stream, the interactive streaming application 132 may interpret the tap or click as a signal of approval. The interactive streaming application 132 may provide information about the signal of approval (e.g., and identifier for who provided the signal and when it was provided) to the server 160. At the server 160, the video streaming engine 172 may receive the engagements and may provide information about the engagements to the viewers and the broadcaster. This information may be used, at each computing device 102, 104, to generate representations of the engagement, as described above. Thus, the video streaming engine 172 provides information to all participants in the real-time video steam about engagements from any of the viewers.

The interactive streaming application 132 may also enable a viewer to enter comments, which are provided to the interactive video sharing engine 170 at the server 160. The interactive video sharing engine 170 may provide information about this engagement, such as the initials or username of the viewer providing the comment, as well as the content of the comment, to viewing devices. In addition to comments, the interactive streaming application 132 may enable a viewer to invite others to view the live video stream. For example, anyone connected to the viewer via the connection graph 168 or 142 may receive a message with an invitation to join the live video stream. The video streaming engine 172 may also enable a viewer to leave the broadcast or rejoin the broadcast at any time.

The interactive streaming application 132 may include a transcoding engine 133, which may be configured to determine the throughput between the computing device 102 and the server computer 160 via the network 150. The throughput represents the bandwidth available to transmit the real-time video stream from the computing device 102 to the server computer 160. When bandwidth is low, the transcoding engine 133 is configured to reduce the video quality sent to the server computer 160. This differs from conventional streaming systems where the server computer 160 determines the video quality sent to each viewer based on the viewer's connection. In contrast, the interactive streaming application 132 decides the video quality for all viewers based on the bandwidth available to the computing device 102. This ensures that latency is kept low, e.g., a few seconds or less. The low latency ensures that engagements are relevant to the broadcaster—in other words, the broadcaster receives almost real-time engagements. A latency more than a few seconds, and certainly a latency of 30 seconds or more would make engagements too old to provide effective communication between the broadcaster and the viewers.

Once a broadcast completes, the interactive video sharing engine 170 may store the video stream formats and the engagement indications that correspond to the video stream, for example storing them in the stored video streams 164. Also, as explained above, the broadcast video stream can be also stored locally on the computing device 102. In some implementations, the broadcaster can prevent the video stream from being stored at the server 160. The interactive video sharing engine 170 may store the engagement indications with the stored video stream, as well as the broadcast metadata. The interactive video sharing engine 170 may delete the stored video stream after the limited time expires. For example, the interactive video sharing engine 170 may delete any saved video streams that are more than 12 or 24 hours old, depending on the length of the limited time. In some implementations, the interactive video sharing engine 170 may enable viewers to select a stored video stream for replay. In some implementations, only those in the original audience (e.g., those indicated by the broadcaster in a private broadcast, or only those following a broadcaster) may replay the video stream. In some implementations any viewer may replay the stored video stream.

During replay of a stored video stream, the interactive video sharing engine 170 may receive additional engagements from the replay viewer. In some implementations, the interactive video sharing engine 170 may aggregate the engagements with the broadcast metadata 166 for the stored video stream. For example, if the replay viewer provides several signals of approval, the interactive video sharing engine 170 may add these to the statistics for the broadcast. In some implementations, the interactive video sharing engine 170 may optionally add the engagements to the stored video stream. For example, the signal of approval from the replay viewer may be assigned a time and engagement indicator in the stored video stream. In some implementations, a replay engagement may include sharing the stored video stream. Sharing may include sending a message, e.g., via a social media platform, with a link or other element that enables others to find and replay the stored video stream.

In some implementations, the interactive streaming application 132 may provide a user interface that enables a user of the computing device 102 to select a stored video stream for replay. For example, the server 160 may store video streams for a limited time (for example 12 or 24 hours). This provides an opportunity for targeted viewers (e.g., followers, friends, circles, or other associations receiving a push notification) who missed the live video stream to view a stored version of the video stream. The replayed version includes all engagement indications received during the live video stream. Thus, the replay viewer can experience the interactions that occurred during the live video stream. In some implementations, the replay viewer may also be able to add engagements to the stored video stream. In other words, a replay viewer may add signals of approval and/or comments. In some implementations, these engagements may be aggregated with metadata for the broadcast, for example in broadcast metadata 166. In some implementations, the new engagement indications may be stored with the stored video stream, so that other replay viewers watching the stored video stream at a subsequent time can see the new engagements added after the live video stream ended.

In some implementations, the interactive video broadcasting service 101 may be used with one or more external sources (e.g., external devices 156) instead of (or addition to) to the computing device 102. For example, in some cases, the mobile device's camera 116 may be relatively difficult to use to capture the broadcaster's event. As such, in some cases, the interactive video broadcasting service 101 may operate in conjunction with an external device 156 having a camera 157 in order to capture the event of the live broadcast media stream instead of using the mobile device's camera 116. Also, the external device 156 may include a microphone 158 for capturing audio data associated with the live broadcast media stream, and the live broadcast media stream may be streamed to other viewing devices (e.g., computing devices 102, 104) with the audio data originating from the external device 156 or the computing device 102 (which may or may not be the same as the source used to capture the video data).

For example, while the interactive streaming application 132 is executing on the computing device 102, one or more external devices 156 may be used to capture the video and/or audio data of the live broadcast media stream. Therefore, the interactive video broadcasting service 101 may enable multiple sources for capturing audio and/or video data of a broadcast of an event, where one or more of the multiple sources is remote from the interactive streaming application 132 executing on the computing device 102 such that the same event can be broadcasted from difficult view points or angles. For instance, while the broadcaster is broadcasting a certain event, the source of the video and/or audio of the live broadcast media stream can be switched to a different source (e.g., switching from the computing device 102 to the external device 156, switching from the external device 156 to the computing device 104, or switching from the external device 156 to another external device 156). In some implementations, the broadcaster may operate the interactive streaming application 132 to switch between multiple video and/or audio sources while the event is being broadcasted by the interactive video broadcasting service 101, or the switching may be performed automatically (e.g., based on the amount of engagements received from other viewing devices, e.g., the amount of signals of approval and/or comments), as further explained below.

The external device 156 may be any type of device having a camera 157 with video capturing capabilities. In some implementations, the external device 156 may also have the microphone 158 to capture audio data associated with the broadcast media stream. The external device 156 may be external in the sense that the external device 156 is separate or remote from the computing device 102. In some implementations, the external device 156 is another computing device 102 (e.g., another smartphone, laptop, etc.). In some implementations, the external device 156 can include a wearable object equipped with a camera 157 and/or microphone 158 (e.g., a helmet-mounted camera, a body-mounted camera, etc.). In some implementations, the external device 156 can include a robotics device or unmanned aerial vehicle (e.g., drone). In some implementations, the external device 156 can include a camera and/or microphone assembly mounted on a vehicle, aircraft, boat, or any type of moving object.

The broadcaster may operate the interactive streaming application 132 to enable one or more of the external devices 156 to be connected to the interactive video broadcasting service 101 such that the interactive video broadcasting service 101 can video stream from the external device(s) 156 (instead of or in addition to the computing device's camera 116). In some implementations, upon start of a live broadcast, the interactive streaming application 132 can connect to one or more of the external devices 156, and provide the option to the broadcaster to select which audio and/or video source to use for the broadcast video stream. In some implementations, the external device 156 is communicatively connected to the computing device 102 via a wired connection. In some implementations, the external device 156 is communicatively connected to the computing device 102 via a wireless connection such as Bluetooth connection, a near-field communication (NFC) connection, or a mobile network connection such as Wi-Fi, 4G, satellite, etc. The external device's camera 157 may capture the broadcast media stream, which is then communicated to the interactive streaming application 132 via the wireless connection. In other implementations, the broadcast media stream is sent from the external device 156(*s*) to the interactive streaming application 132 over the network 150 via one or more of the servers 160, 161. Then, the interactive streaming application 132 may stream the broadcast media stream (originating from one or more of the external devices 156 or the computing device 102 itself) to the interactive video broadcasting service 101 over the network 150 to be shared with a plurality of viewing devices, in the manner as described above.

In some implementations, the interactive streaming application 132 may select the type of network connection to the external device 156, which may be based on the type of external device, video quality, audio quality, and/or the range between the computing device 102 and the external device 156. In some examples, if the external device 156 is a type of drone device, a short-range communication network such as Bluetooth may not work because the drone device may be too far out of range. In this case, the interactive streaming application 132 may select a mobile network connection such as 4G or Wi-Fi network for communicating with the external device 156. Also, the interactive streaming application 132 may switch from one type of network connection to another type of network connection during the broadcast when the currently-used network connection provides a relatively low video and/or audio quality, or the external device 156 moves out of range for a particular network connection. Also, the interactive streaming application 132 may select another audio and/or video source when the currently-provided video and/or audio source provides a relatively low video and/or audio quality. For example, the interactive streaming application 132 may switch from the external device's camera 157 to the computing device's camera 116 during the course of broadcasting the media stream when the video quality drops below a threshold level.

Also, the interactive streaming application 132 may select an audio source from multiple audio sources, which may or may not be the same source that is used to provide the video data of the broadcast media stream. For example, the external device's microphone 158 may capture audio data associated with the broadcast media stream. Depending on the quality of the audio data (and potentially the quality of the video data), the interactive streaming application 132 may select the external device 156 to provide both the audio data and the video data of the broadcast video stream, select the external device 156 to provide the video data and another external device 156 to provide the audio data, select a particular external device 156 to provide the video data and the computing device 102 to provide the audio data, or select the computing device 102 to provide the video data, and a particular external device 156 to provide the audio data. In one example, if the sound of the audio data captured by external device 156 is below a threshold level (or the quality of the audio data is below a threshold level), the interactive streaming application 132 may switch the audio source to the computing device 102 (or vice versa).

As explained above, the interactive video broadcasting service 101 may use an audio source different from the source used for the video. In one example, a skier may be using the external device 156 as a helmet-mounted camera and another external device 156 as a drone that follows him/her down the slope, and the interactive video broadcasting service 101 may have audio captured from the helmet-mounted camera (i.e., the helmet-mounted camera also has the microphone 158) because it can capture his/her narration (and the swoosh of the skis against the snow) while the video can be captured from the done since the drone may provide better panoramic images.

In some implementations, the broadcaster may operate the interactive streaming application 132 to enable multiple external devices 156 to be connected to the interactive video broadcasting service 101 such that the interactive video broadcasting service 101 can stream from multiple sources to provide the viewers with different viewing angles of the same event at the same time or at different times. The broadcaster may operate the interactive streaming application 132 to enable the camera 116 in conjunction with one or more of the external devices 156 to be connected to the interactive video broadcasting service 101.

The broadcaster may operate the interactive streaming application 132 to switch the video and/or audio sources of the broadcast media stream before or during the broadcast. In other implementations, the interactive streaming application 132 may automatically select the video and/or audio sources of the broadcast media stream before or during the broadcast in the manner as explained above. In other implementations, the interactive video broadcasting service 101 may include a source manager 175 configured to manage the audio and/or video sources of the broadcast media stream. For example, the source manager 175 may be configured to automatically select between the external device 156, another external device 156, and the computing device 102 for the video and/or audio source(s) of the broadcast media stream before or during the broadcast, in the same manner as discussed with respect to the interactive streaming application 132. In some implementations, the source manager 175 may manage information about the various audio and/or video sources such as the type of external device(s) 156 connected to the interactive video broadcasting service 101, the type of connection used in conjunction with a respective external device 156, and/or any other information about these devices. Also, in some implementations, the source manager 175 may select the type of network connection to be used in conjunction with a respective external device 156 in the same manner described above.

In some implementations, the automatic switching may be based on the engagements associated with the broadcast video stream (e.g., the amount of signals of approval, comments, and/or join messages, etc.). In one example, the computing device 102 may be a smartphone that is tucked away, so that the broadcaster will not be able to see or monitor the received engagements on the display 118, the video source may be automatically switched based on the amount of engagements (e.g., the event may be broadcast from two or more video sources, which receive engagements on the various different view points or angles, and the one with the highest amount of engagements may be automatically selected). Alternatively, the interactive streaming application 132 may enter an audio or haptic feedback mode in which the signals of approval make a sound or cause the computing device 102 to vibrate, and the broadcast can manual switch video sources (e.g., by providing audio commands to the interactive streaming application 132 or operating it's user interface). In another implementation, comments from the viewers can be verbalized (e.g., through the speaker or through ear phones connected to the computing device 102). Based on the comments, the broadcaster may decide to switch to another video source.

In some implementations, the source manager 175 (or the interactive streaming application 132) may automatically select the video source based on the number of signal of approval on the broadcast media stream from the viewing devices. For example, the broadcast media stream may be initially broadcasted with the external device 156 as the video source. The source manager 175 may determine the amount of approval signals associated with this broadcast during a period of time, and if the number is below a threshold amount, the source manager 175 may switch the video source to the mobile device's camera 116. In some implementations, if the number of approval signals is above a threshold amount, the source manager 175 may determine to keep the video source as the external device 156. In other implementations, the broadcaster may switch the video source from the external device 156 to the mobile device's camera 116 (or another external device 156). Then, the source manager 175 may receive an amount of approval signals on the broadcast media stream originating from the mobile device's camera 116 over a period of time, and may compare the amount of approval signals associated the broadcast media stream of the external device 156 to the amount of approval signals associated with the broadcast media stream of the mobile device's camera 116, and switch to the video source providing the greater amount of approval signals.

In other implementations, the source manager 175 and/or the interactive streaming application 132 may use information from the accelerometer 151, and switch the audio and/or video sources of the broadcast media stream. For example, an event may be initially broadcasted with the external device 156, but the source manager 175 and/or the interactive streaming application 132 may detect acceleration of the computing device 102, and then decide to switch to the mobile device's camera 116 or decide to keep the external device 156 as the video source. In other implementations, the external device 156 may be equipped with the accelerometer 151, and if the source manager 175 and/or the interactive streaming application 132 detects acceleration above a threshold level, the source manager 175 and/or the interactive streaming application 132 may switch to that external device 156 (which may indicate that some kind of action is taking place around that external device 156). In other implementation, the source manager 175 and/or the interactive streaming application 132 may detect acceleration of the computing device 102 and/or the external device 156, and then switch the audio source and/or video source to the source that is moving the least (or moving the most). In other implementations, the source manager 175 and/or the interactive streaming application 132 may use information from the GPS 124 about the location of the computing device 102 and information from a GPS-equipped external device, and based on the location data, the source manager 175 and/or the interactive streaming application 132 may switch the video and/or audio sources.

It is noted that although the components of the interactive video broadcasting service 101 are depicted on the server-side, some or all of one or more of these components may be implemented on the client-side, e.g., on the computing device 102.

Figure 2:
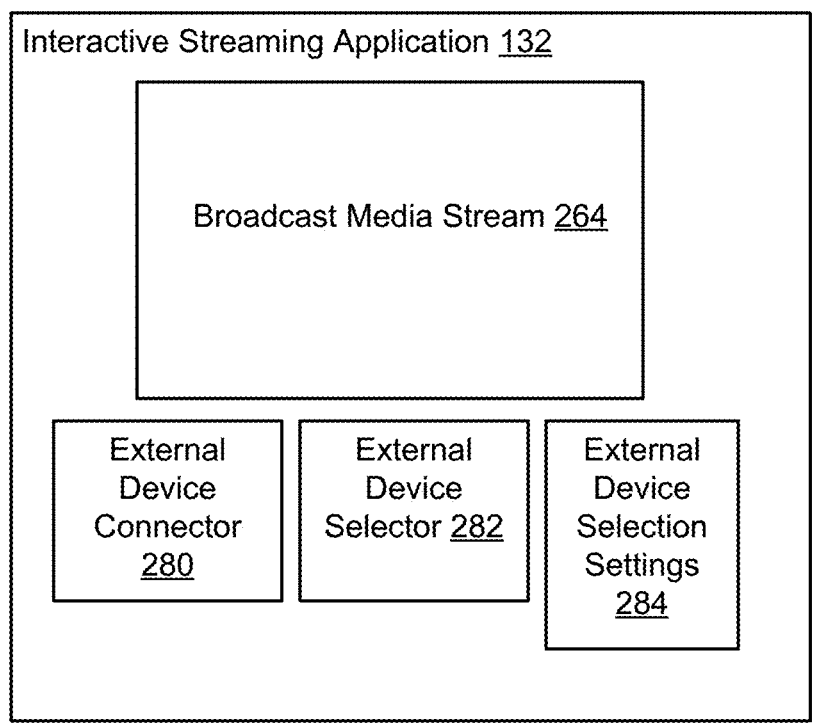
FIG. 2 is a schematic diagram of a display of an interactive streaming application executing on a computing device according to an implementation.

FIG. 2 is a schematic diagram of is a schematic diagram of a display of the interactive streaming application 132 according to an implementation. The interactive streaming application 132 may provide a display of a broadcast media stream 264. In some implementations, the interactive streaming application 132 may include an external device connector 280 which allows the interactive streaming application 232 to connect to one or more of the external devices 156. For example, a broadcaster may select this option to add an external device 156 to operate with the interactive video broadcasting service 101, which can also define the network connection settings with the external device 156, and/or manage the external device 156 within the context of the interactive video broadcasting service 101. In some implementations, the interactive streaming application 232 may include an external device selector 282 to permit the broadcaster to select a video source (or audio source) among a plurality of sources before or during the live broadcast. For example, during the live broadcast, the broadcaster may be able to select which video source (or audio source) to provide the broadcast media stream 264. In some implementations, the interactive streaming application 232 may provide external device selection settings 284 to permit the broadcaster to define when to automatically select among the various video and/or audio sources. For example, the external device selection settings 284 may provide options to the broadcaster on when to switch from the camera 116 to the external device 156 (or vice versa), and/or from one particular external device 156 to another external device 156. The interactive streaming application 132 and/or the source manager 175 may carry out the video and/or audio source selection based upon the external device selecting settings 284.

Figure 3A:
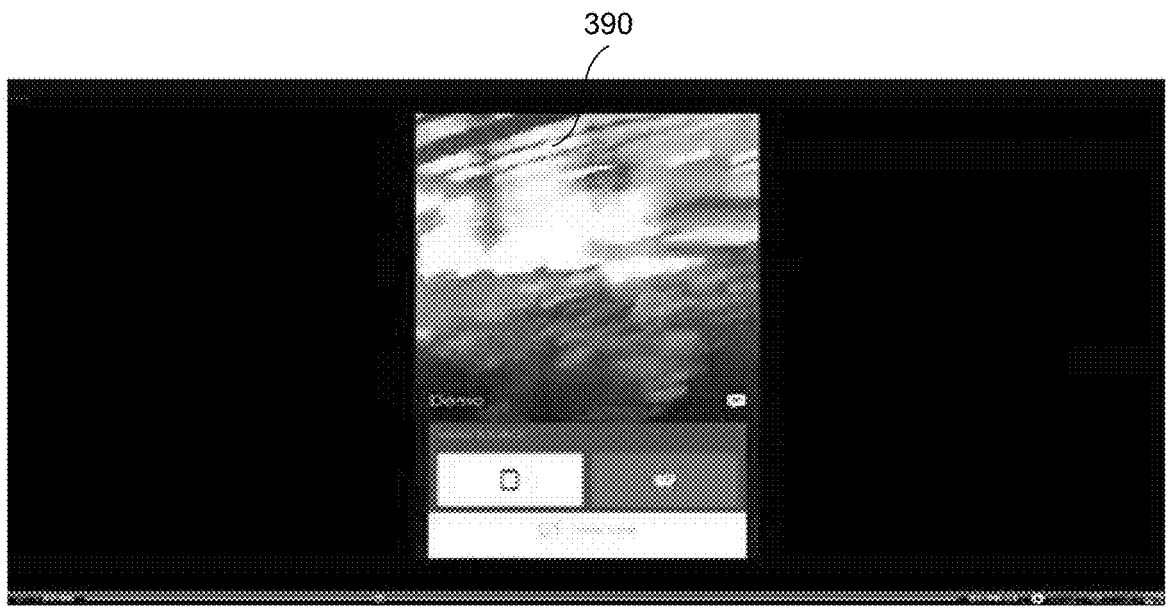
FIG. 3A is a screenshot of a display of the interactive streaming application depicting a broadcast stream from a first source according to an implementation.
Figure 3B:
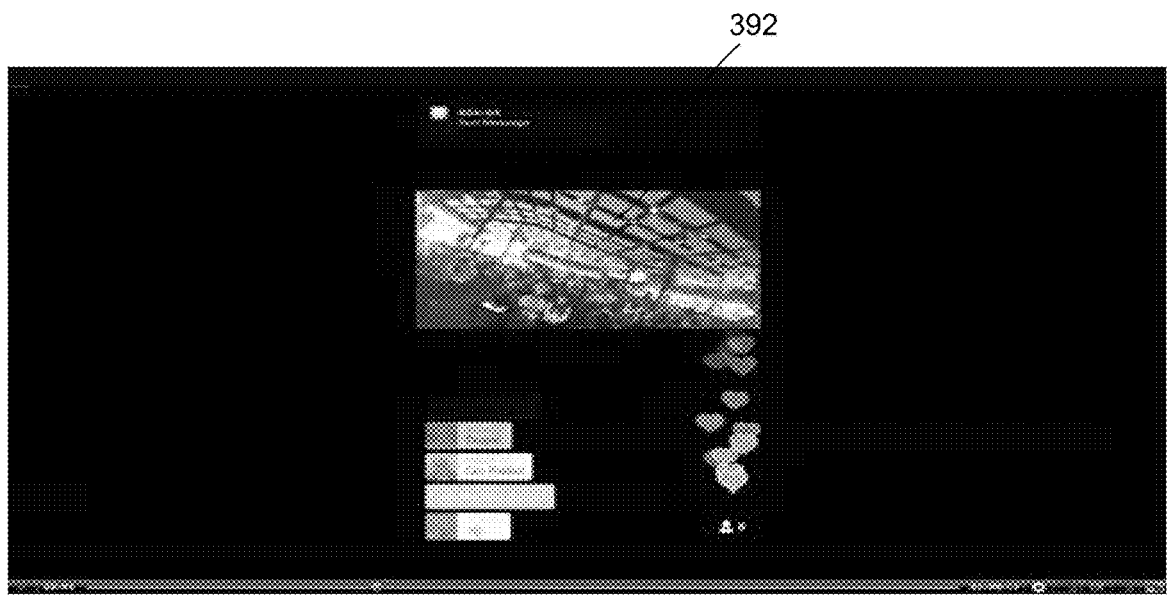
FIG. 3B is another screenshot of a display of the interactive streaming application depicting a broadcast stream from a second source according to an implementation.
Figure 3C:
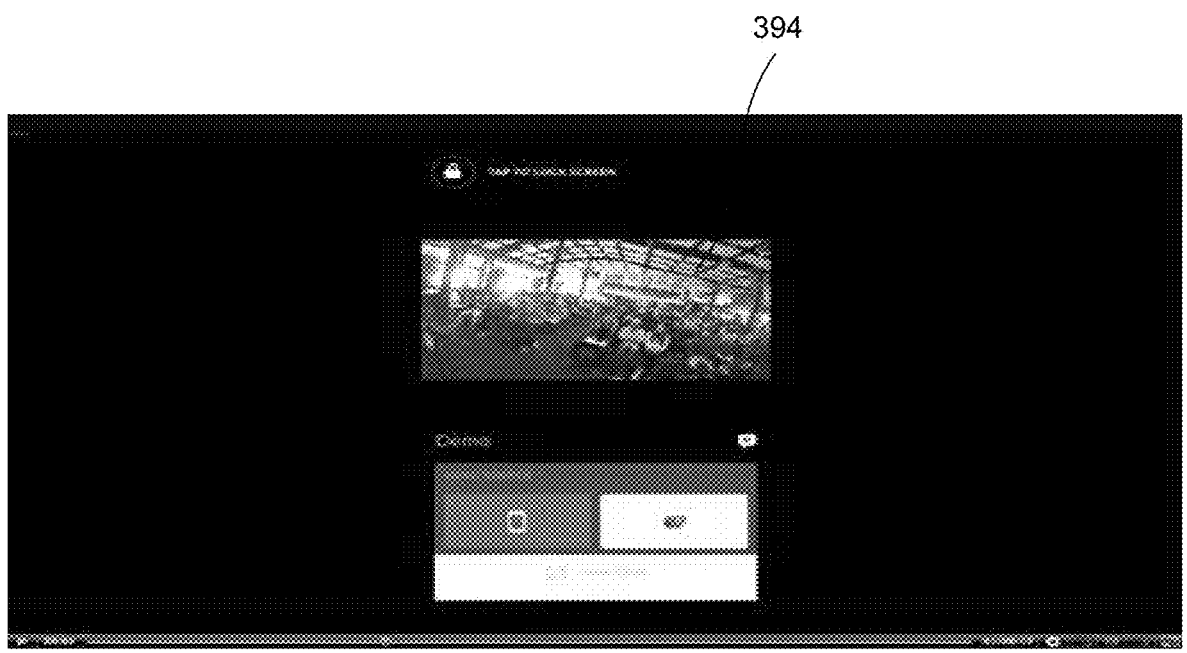
FIG. 3C is another screenshot of a display of the interactive streaming application depicting a broadcast stream from a third source according to an implementation.

FIGS. 3A-3C illustrate screenshots depicting different views captured by different cameras while continuously broadcasting the underlying event according to an aspect. For example, FIG. 3A is a screenshot of a display of the interactive streaming application 132 depicting a first broadcast stream 390 from a first video source according to an implementation, FIG. 3B is another screenshot of a display of the interactive streaming application 132 depicting a second broadcast stream 392 from a second video source according to an implementation, and FIG. 3C is another screenshot of a display of the interactive streaming application 132 depicting a third broadcast stream 394 from a third video source according to an implementation. The first video source, the second video source, and the third video source may be different video sources, and may correspond to different external devices 156 and/or computing device 102.

Figure 4:
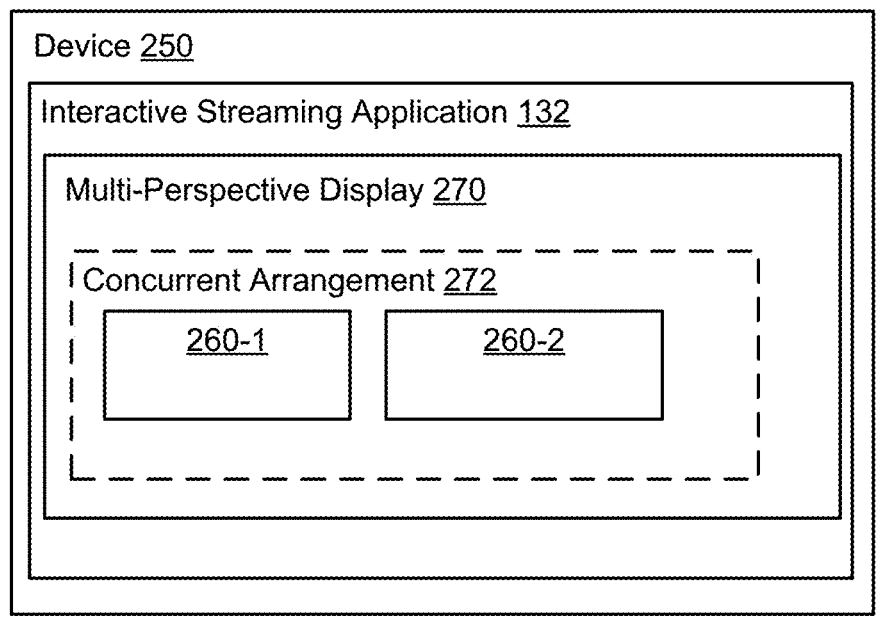
FIG. 4 is a schematic diagram of a multi-perspective display of the interactive streaming application according to an implementation.

FIG. 4 illustrates a multi-perspective display 270 of the interactive streaming application 132 according to an implementation. In some implementations, the interactive video broadcasting service 101 may be configured to create a multi-perspective experience of the same event from various video sources, which may be from the same broadcaster (e.g., using one or more external devices 156) or different broadcasters. For example, the interactive streaming application 132 may provide a multi-perspective display 270, over the network 150, to the user interface of the interactive streaming application 132. The multi-perspective display 270 may include a concurrent arrangement section 272 displaying a concurrent view of multiple broadcast streams (e.g. a first broadcast stream 260-1 and a second broadcast stream 260-2). The first broadcast stream 260-1 may have originated from a video source different from a video source of the second broadcast stream 260-1. The first and second broadcast streams 260-1, 260-2 may be displayed at the same time in different portions of the user interface.

Figure 5:
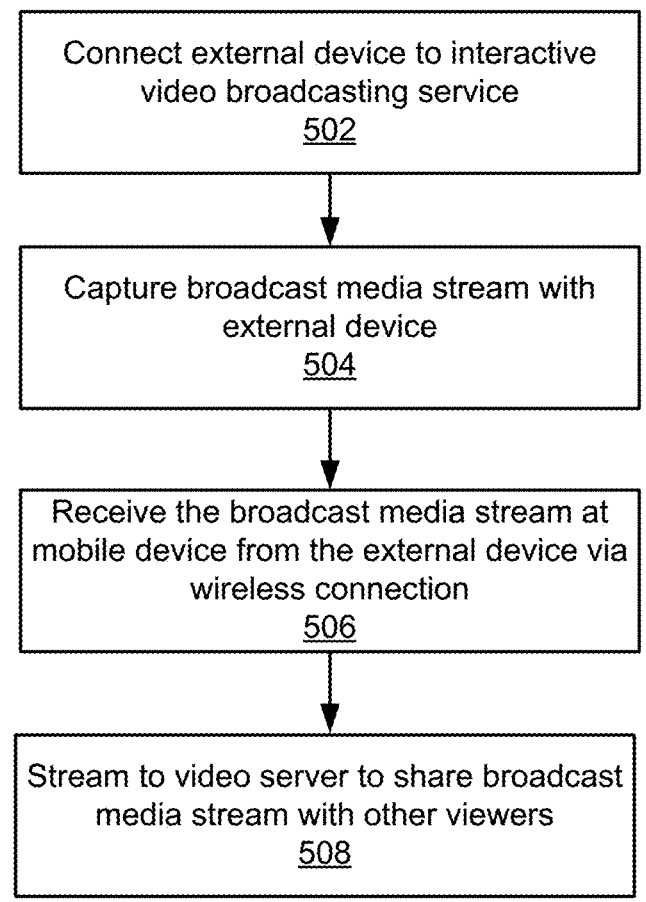
FIG. 5 is a flowchart depicting example operations of the system of FIG. 1 according to an implementation.

FIG. 5 illustrates a flow chart illustrating a method 500 depicting example operations of the system of FIG. 1 according to an implementation.

An external device may be connected to an interactive video broadcasting service (502). For example, the external device 156 may be communicatively coupled to the computing device 102, which is in communication with the interactive video broadcasting service 101. The external device 156 may be communicatively coupled to the computing device 102 via any type of short-range communication connection (e.g., Bluetooth) or mobile network connection (e.g., Wi-Fi, 4G etc.).

A media broadcast stream may be captured with the external device (504). For example, the external device's camera 157 may be used to capture the video data of the media broadcast stream. The external device's camera 157 may be remote from the computing device 102. A broadcast media stream may be received at the mobile device from the external device via a wireless connection (506). For example, the computing device 102 may receive the broadcast media stream from the external device 156 via the wireless connection. The broadcast media stream may be streamed to a video server to share the broadcast media stream with other viewers (508). For example, the computing device 102 may stream the broadcast media stream originating from the external device to the video server 160 having the interactive video broadcasting service 101 in order to share the broadcast media stream with other viewing devices.

Figure 6:
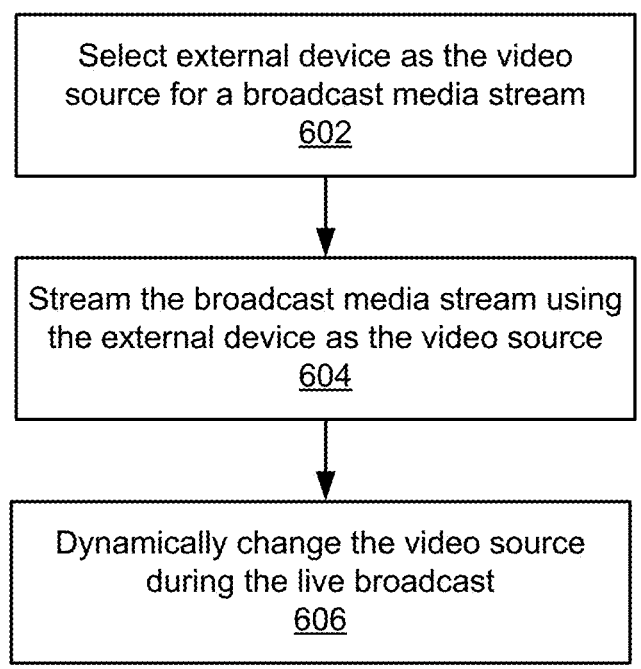
FIG. 6 is a flowchart depicting example operations of the system of FIG. 1 according to an implementation.

FIG. 6 illustrates a flow chart illustrating a method 600 depicting example operations of the system of FIG. 1 according to an implementation.

An external device may be selected as the video source for a broadcast media stream (602). For example, the computing device 102 may be executing the interactive streaming application 132, and the broadcaster may select the external device 156 as the video source for the broadcast media stream (instead of using the computing device's camera 116). The broadcast media stream may be streamed to viewing devices using the external device as the video source (604). For example, the interactive streaming application 132 may receive the video feed from the external device 156 via the wireless connection, and upload the broadcast media stream to the video server 160 over the network 150 to be shared with the plurality of viewing devices. The video source may be dynamically changed during the live broadcast (608). For example, during the course of the live broadcast, the video source may be dynamically switched to a different video source, e.g., switch to the computing device's camera 116 or another external device 156. In this manner, the viewing devices are provided with different angles or points of view of the underlying event.

Figure 7:
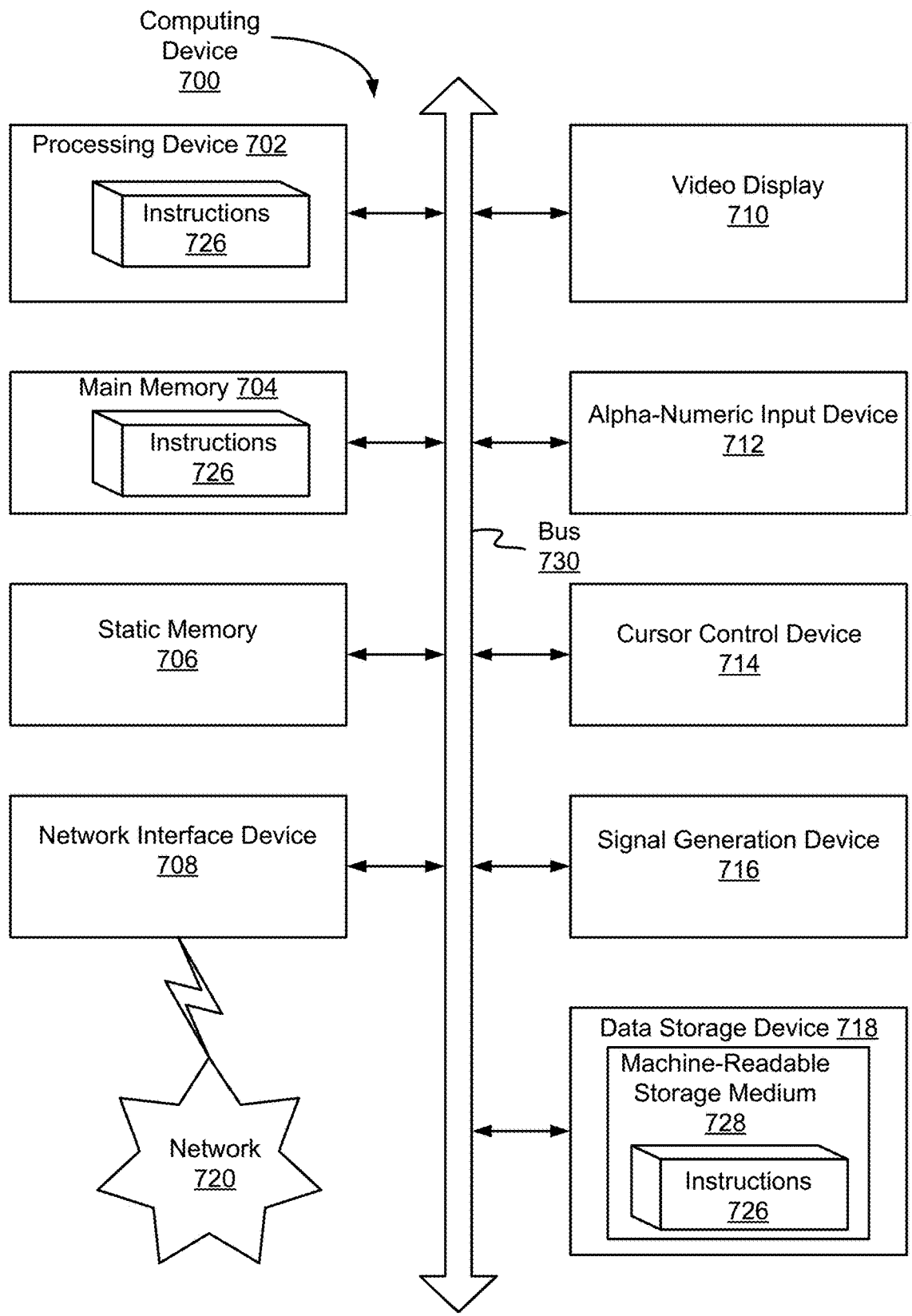
FIG. 7 shows an example of a computer device and a mobile computer device that can be used to implement the techniques described here.

FIG. 7 illustrates a diagrammatic representation of a machine in the example form of a computing device 700 within which a set of instructions, for causing the machine to perform any one or more of the methodologies discussed herein, may be executed. The computing device 700 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In one implementation, the computing device 700 may present an overlay UI to a user (as discussed above). In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 (e.g., instructions for an application ranking system) for performing the operations and steps discussed herein.

The computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and a signal generation device 716 (e.g., a speaker). In one implementation, the video display unit 710, the alphanumeric input device 712, and the cursor control device 714 may be combined into a single component or device (e.g., an LCD touch screen).

The data storage device 718 may include a computer-readable storage medium 728 on which is stored one or more sets of instructions 726 (e.g., instructions for the application ranking system) embodying any one or more of the methodologies or functions described herein. The instructions 726 may also reside, completely or at least partially, within the main memory 704 and/or within the processing device 702 during execution thereof by the computing device 700, the main memory 704 and the processing device 702 also constituting computer-readable media. The instructions may further be transmitted or received over a network 720 via the network interface device 708.

While the computer-readable storage medium 728 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

What is claimed is:

1. A social media platform comprising:
a video broadcasting service, implemented on a server, configured to transmit, over a network, digital information to a client application executable by a computing device, the digital information being used to render and display a timeline of social content,
the video broadcasting service configured to enable the client application to broadcast a live feed media stream of an event, over the network, to a plurality of viewing devices each of which is executing the client application, the live feed media stream being captured by a plurality of video sources, the plurality of video sources including a camera on an external device and a camera on the computing device,
wherein a video source of the live feed media stream is switched between the camera on the external device and the camera on the computing device at a point after a start of the live feed media stream and before an end of the live feed media stream,
wherein the switching is based on an amount of user engagements associated with the live feed media stream, the user engagements including signals of approvals that are provided to the viewing devices and broadcasting device during the live feed media stream.

2. The social media platform of claim 1, wherein the video broadcasting service is configured to:
determine a first number of the user engagements received when the live feed media stream is captured using the camera of the computing device;
determine a second number of the user engagements received when the live feed media stream is captured using the camera of the external device; and
select the camera of the external device in response to the second number being higher than the first number.

3. The social media platform of claim 1, wherein the video broadcasting service is configured to provide a multi-perspective display of the live feed media stream, the multi-perspective display providing a concurrent display of a first live feed media stream captured by the external device, and a display of a second live feed media stream captured by the camera of the computing device.

4. The social media platform of claim 1, wherein the video source of the live feed media stream is the camera on the external device, and an audio source of the live feed media stream is a microphone of the computing device.

5. The social media platform of claim 1, wherein the plurality of video sources include a secondary external device, wherein the video source of the live feed media stream is switched between the camera on the external device, the camera on the computing device, a camera on the secondary external device at multiple times after the start of the live feed media stream and before the end of the live feed media stream.

6. The social media platform of claim 1, wherein the client application is configured to receive video selection information at a point in time after the start of the live feed media stream and before the end of the live feed media stream, wherein the video switch is switched between the camera on the computing device and the camera on the external camera in response to receipt of the video selection information.

7. The social media platform of claim 1, wherein the video broadcasting service is configured to determine, using a connection graph, user accounts directly related to a user account of the client application of the computing device, and the video broadcasting service is configured to send a push notification to computing devices of the user accounts regarding the live feed media stream.

8. The social media platform of claim 1, wherein the server is configured to store the live feed media stream for later retrieval as a replay, wherein when the replay is selected, the media stream is replayed along with engagement indications as they occurred during the live feed media stream.

9. The social media platform of claim 1, wherein the external device is communicatively coupled to the computing device, the client application is configured to select a type of network connection between the computing device and the external device based on a type of external device, video quality, audio quality, or range between the computing device and the external device.

10. A social media platform comprising:
a client application executable by a computing device, the client application configured to render and display a timeline of social content,
the client application configured to broadcast, via a video broadcast service, a live feed media stream of an event, over a network, with a plurality of viewing devices, the live feed media stream being captured by a plurality of video sources, the plurality of video sources including a first external camera device and a second external camera device, the first and second external camera devices being devices separate from the computing device executing the client application,
wherein a video source of the live feed media stream is switched between the first external camera device and the second external camera device at multiple points after a start of the live feed media stream and before an end of the live feed media stream,
wherein the switching is based on an amount of user engagements associated with the live feed media stream, the user engagements including signals of approvals that are provided to the viewing devices and broadcasting device during the live feed media stream.

11. The social media platform of claim 10, wherein the client application is configured automatically select a wireless connection between the first external camera device and the client application among a plurality of available wireless connections based on a type of the first external camera device, video quality, audio quality, and range between the computing device and the first external camera device.

12. The social media platform of claim 10, wherein the first external camera device is communicatively coupled to the computing device via a Bluetooth connection, a mobile network, or a Wi-Fi network connection.

13. The social media platform of claim 10, wherein the first external camera device is communicatively coupled to the server, and the second external camera device is communicatively coupled to the computing device.

14. The social media platform of claim 10, wherein the first and second external camera devices are communicatively coupled to the computing device.

15. The social media platform of claim 10, wherein the first and second external camera devices are communicatively coupled to the server.

16. The social media platform of claim 10, wherein the first external camera device includes a camera-equipped drone.

17. A non-transitory computer-readable medium storing executable instructions that when executed by at least one processor is configured to cause the at least one processor to:
- display, by a client application executable by a computing device, a timeline of social content;
- broadcast, via a video broadcast service, a live feed media stream of an event, over a network, with a plurality of viewing devices, the live feed media stream being captured by a plurality of video sources, the plurality of video sources including a camera on the computing device, a camera on a first external device, and a camera on a second external device, the first and second external devices being communicatively coupled to the computing device or a server executing the video broadcast service,
- wherein a video source of the live feed media stream is switched between the camera on the first external device, the camera on the second external device, and the camera on the computing device at multiple points after a start of the live feed media stream and before an end of the live feed media stream,
- wherein the switching is based on an amount of user engagements associated with the live feed media stream, the user engagements including signals of approvals that are provided to the viewing devices and broadcasting device during the live feed media stream.

18. The social media platform of claim 1, wherein the external device is communicatively coupled to the server.

19. The social media platform of claim 1, wherein the external device is communicatively coupled to the computing device.

* * * * *